(12) United States Patent
Yoshinaga et al.

(10) Patent No.: US 7,654,900 B2
(45) Date of Patent: Feb. 2, 2010

(54) IMAGE DISPLAY METHOD

(75) Inventors: Takumi Yoshinaga, Tokyo (JP); Hitoshi Nakanishi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 578 days.

(21) Appl. No.: 10/267,770

(22) Filed: Oct. 10, 2002

(65) Prior Publication Data

US 2003/0114223 A1 Jun. 19, 2003

(30) Foreign Application Priority Data

Oct. 11, 2001 (JP) ............................. 2001-314410

(51) Int. Cl.
*A63F 13/00* (2006.01)

(52) U.S. Cl. ...................................................... 463/31

(58) Field of Classification Search ................. 463/4–9, 463/30–34, 48
See application file for complete search history.

(56) References Cited

U.S. PATENT DOCUMENTS

| 5,137,277 | A | * | 8/1992 | Kitaue | 463/2 |
| 5,935,004 | A | * | 8/1999 | Tarr et al. | 463/40 |
| 6,093,105 | A | * | 7/2000 | Morihira | 463/38 |
| 6,146,269 | A | * | 11/2000 | Morihira | 463/8 |
| 6,390,922 | B1 | * | 5/2002 | Vange et al. | 463/42 |
| 6,425,827 | B1 | * | 7/2002 | Nimura | 463/35 |
| 6,461,239 | B1 | * | 10/2002 | Sagawa et al. | 463/7 |
| 6,488,586 | B1 | * | 12/2002 | Kobayashi et al. | 463/43 |
| 6,554,711 | B1 | * | 4/2003 | Kawasaki et al. | 463/43 |
| 6,620,042 | B1 | * | 9/2003 | Nagata | 463/5 |
| 6,729,966 | B1 | * | 5/2004 | Barelli et al. | 473/236 |
| 6,878,058 | B1 | * | 4/2005 | Serizawa et al. | 463/8 |

FOREIGN PATENT DOCUMENTS

| EP | 0972550 A | 1/2000 |
| JP | 2000-218046 | 8/2000 |
| JP | 2000-262738 | 9/2000 |
| JP | 2000-300840 | 10/2000 |

(Continued)

OTHER PUBLICATIONS

Robert Brady "Doom" Totally Unauthorized Tips and Secrets, Brady Games, see all pages, Dec. 1994.*

(Continued)

*Primary Examiner*—Ronald Laneau
*Assistant Examiner*—Tramar Harper
(74) *Attorney, Agent, or Firm*—Finnegan, Henderson, Farabow, Garrett & Dunner, L.L.P.

(57) ABSTRACT

It is an object of this invention to display the marks obtained by a player corresponding to game scenes by switching between an analog score display and a digital point display. In this invention, a key input detecting means, detects keys input by the player and obtains key operation signals. A correct or incorrect answer determining means, determines whether the answer is correct or incorrect by comparing the key operation signals with the correct input patterns. A point/score calculating means, calculates the marks obtained by the player on the basis of the correct or incorrect answer determination. A point/score display switching means, generates video signals for displaying the marks obtained by the player corresponding to the game scenes, by switching between an analog score display and a digital point display.

6 Claims, 9 Drawing Sheets

FOREIGN PATENT DOCUMENTS

| | | | |
|---|---|---|---|
| JP | 2001-038055 | | 2/2001 |
| JP | 2001-070653 | | 3/2001 |
| WO | WO96/36016 | * | 11/1996 |

OTHER PUBLICATIONS

Midway, "Pac-Man," http://www.klov.com/p/pac-man.html.

"NINTENDO 64 Winning Strategy Special—Star Fox 64 First Edition," Kabushikikaisha Keibunsha, Jul. 16, 1997, First Edition, pp. 16-17.

"Notification of Reasons for Refusal," Japanese Patent Office, Dec. 12, 2005.

"Notice of Reasons for Refusal," Japanese Patent Office, Aug. 26, 2005.

Japanese Patent Office Notice of Reasons for Rejection, Application No. JP-2001-314410, mailed Nov. 26, 2007.

"Weekly Famitsu, Nov. 28, 1997 Issue (Bust A Move)," Nov. 28, 1997 by ASCII Corporation, vol. 12, No. 48, pp. 212-213.

English language translation of JP 2000-218046 (56 pages).

* cited by examiner

IMAGE DISPLAY METHOD

BACKGROUND OF THE INVENTION

1. Field of the Invention

The present invention relates to an image display technique for game screens and particularly to an improved technique for making a game environment amusing.

2. Description of the Related Art

FIG. 18 is an example game screen of a fight game in which characters in the similitude of fighters, fight against each other. In FIG. 18, a reference numeral 50 refers to a player character operated by a player, and a reference numeral 40 refers to an enemy character that fights against the player character 50, and a reference numeral 71 refers to a life gauge for displaying the remaining energy value (variable) virtually possessed by the enemy character 40, and 72 is a life gauge of the player character 50. Concerning the life gauges 71 and 72, when the relevant character receives an attack with great destructive power from the opponent, such as a knockdown blow, a large decrease in the life gauge is displayed. On the other hand, when the relevant character receives an attack with little destructive power, such as a minor blow, a small decrease in the life gauge is displayed. Accordingly, the player is always able to keep track of the damage amount of the player character 50 operated by him or herself, and the damage amount of the enemy character 40 operated by the opponent and can strategically proceed with the game while monitoring both life gauges. In this specification, in order to continue playing the game, this method of displaying on the game screens, a variable that changes in a large or small amount according to the extent of the player's advantageous and/or disadvantageous states, and as a quantity continuously varying per highly fragmented unit quantity, is referred to as a "highly fragmented display."

FIG. 19 is an example game screen of a battle game in which characters in the similitude of fighter airplanes, battle against each other in the air. In FIG. 19, reference numerals 40 and 50 refer to characters operated by a player and his/her opponent respectively, and are in the similitude of appearances of fighter airplanes. The player executes input operation on a controller and shoots down the enemy character 40 by firing a projectile 80. In this kind of game, as shown by reference numeral 73, a plurality of fighter airplanes able to battle are positioned to stand by in advance, and the number of the fighter airplanes is displayed on the game screen so that the player can be aware of how many fighter airplanes are left. In addition, when the player character 50 operated by the player is shot down due to an opponent's attack, the fighter airplanes which have been standing by decrease one by one and the number of the fighter airplanes remaining is displayed. Regardless of the strength of the destructive power of the other player's attack, the player character 50 is shot down after receiving damage from the projectile 80, and therefore, the number of the fighter airplanes which are able to battle (the number of fighter airplanes remaining) is determined in accordance with the number of the player's mistakes. In this specification, the method of displaying a variable which varies per predetermined unit quantity (roughly fragmented unit) according to the number of the player's mistakes, such as the number of the fighter airplanes which are able to battle remaining or the number of possible battles, is referred to as a "roughly fragmented display."

As mentioned above, in order to decide which display, either "highly fragmented display" or "roughly fragmented display," should be adopted, it is necessary to examine the type, nature and contents of the game. For example, the "highly fragmented display" is suitable for a scene in which a few player mistakes are permitted and the player can enjoy the game in a comfortable atmosphere, while the "roughly fragmented display" is suitable for a scene in a tense atmosphere where even a slight player mistake can be fatal and, therefore, no mistakes are permitted. Therefore, even in the same game, by switching between the "highly fragmented display" and the "roughly fragmented display" for each scene, it is possible to heighten or ease a tense atmosphere and to create a lively game environment.

On the other hand, in a conventional quiz game, the setting of a quiz question in a window on the game screen and presentation of a plurality of alternative answers is suggested. In order to select one answer, the player executes key operation on a controller, puts a cursor on the answer they wish to select, and inputs a decision button. However, in a conventional game device, no matter which answer is selected, the acting performance of the character that answers a quiz question is always the same and cannot be altered in accordance with the player's feelings when he/she is playing the game. For example, when the character answers a quiz question, the manner in which the character raises his/her hand, the character's facial expression, the volume of the character's voice, the character's posture and so on are stereotyped. Whether or not the player answers a quiz question with confidence, the acting performance of the character answering the quiz question is always the same, and this lacks spice.

Therefore, it is the first object of the present invention to realize a more amusing and enjoyable game environment by switching between the "highly fragmented display" and the "roughly fragmented display" for each game scene in the same game.

Moreover, it is the second object of the present invention to realize a more amusing and enjoyable game environment by changing, under the circumstances in which the player is required to execute any key input operation, the acting performance of the characters displayed on the game screen according to the input operation chosen by the player.

SUMMARY OF THE INVENTION

In order to achieve the first object, in order to continue playing the game, the image display method of the present invention is provided to display a player's variable capable of changing in a large or small amount, as a quantity continuously varying per highly fragmented unit quantity in a first game scene, and as a quantity continuously varying per roughly fragmented unit quantity in a second game scene, by switching between these display forms for each game scene.

Accordingly, by changing the display form of the variable according to the game scenes, it is possible to realize game scenes that can be comfortably enjoyed and game scenes with a tense atmosphere. Moreover, by changing the display form of the variable according to the game characteristics, it is possible to make determinations and evaluations which are suited to the game and to create a more amusing game environment.

In order to achieve the second object, the image display method of the present invention is provided to change the motion state of a character according to the type of key input by the player, under the circumstances in which the character displayed on a game screen makes motions with the same purpose regardless of which key among a plurality of keys is inputted, and where the player is required to execute such key input.

The "motions with the same purpose" refers to motions with a common purpose such as the character "raising his/her hand" at the time of answering a quiz question. The "motion state" refers to the state of the "motions with the same purpose" such as "raising a hand with confidence" and "raising a hand without confidence." Accordingly, the motion state of the character can be changed through the player's input operation, thereby enabling the player to demonstrate the acting performance.

It is possible to record a program to make a computer system execute the above-described image display method on a computer-readable recording medium. Examples of such computer-readable recording medium include: an optical recording medium (optically data readable recording medium such as CD-RAM, CD-ROM, DVD-RAM, DVD-ROM, DVD-R, PD disc, MD disc, and MO disc); a magnetic recording medium (magnetically data readable recording medium such as a flexible disc, magnetic card, and magnetic tape); and a portable recording medium such as a memory cartridge having a memory device (a semiconductor memory device such as DRAM, or a ferroelectric memory device such as FRAM).

Moreover, the above-described program can be distributed on an on-demand basis from a network server, such as a Web server, in response to a request from a client device (a personal computer, a game device, a cellular telephone with a Web browser mounted thereon, or a portable information terminal such as PDA) which is connected with an open network such as the Internet network or a packet telecommunication network.

DESCRIPTION OF THE PREFERRED EMBODIMENTS

Embodiments of the present invention are now explained with reference to the relevant drawings.

Figure 1:
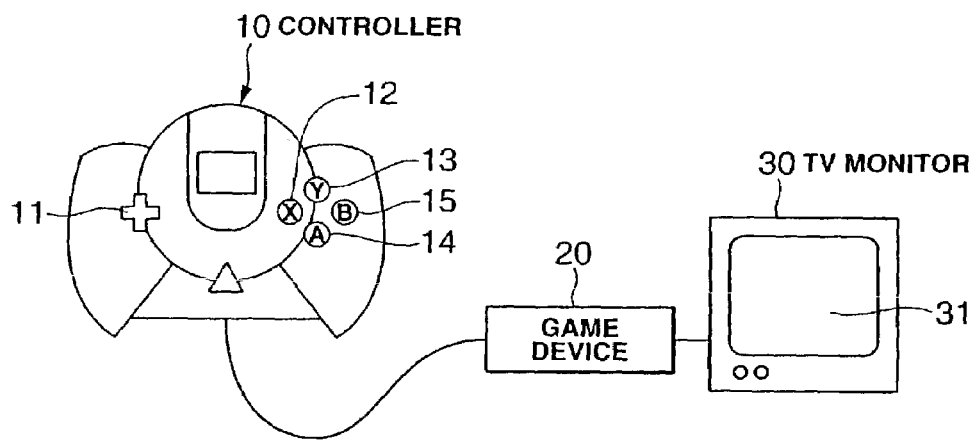
FIG. 1 is a diagram showing the connection structure of the game device and the peripheral device.

FIG. 1 shows the connection structure between the game device and the peripheral device. In FIG. 1, a reference numeral 10 refers to a controller, a reference numeral 20 refers to a game device, and a reference numeral 30 refers to a TV monitor of the NTSC system. A direction key 11, button X 12, button Y 13, button A 14, and button B 15 on the controller 10 are placed. The game device 20 conducts game processing by obtaining operation signals which are outputted from the controller 10 in accordance with the player's key/button input operation. The game device 20 contains a video processor for generating images and an audio processor for generating sounds, and outputs the video signals and audio signals generated by those processors to the TV monitor 30. The game screen is displayed on a display 31 of the TV monitor 30.

Figure 2:
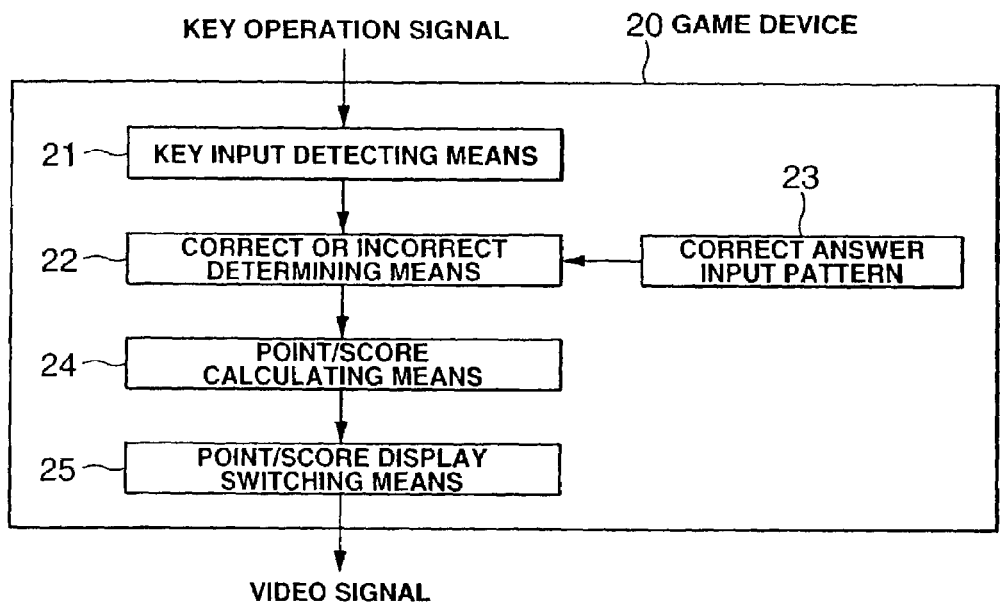
FIG. 2 is a functional block diagram of the game device.

FIG. 2 is a functional block diagram of the game device 20. As shown in FIG. 2, the game device 20 comprises a key input detecting means a correct or incorrect answer determining means 22, a correct answer input pattern 23, a point/score calculating means 24, and a point/score display switching means 25. Each of these means is realized in cooperation with hardware and software by executing a game program on an operating system. In this game, an enemy character appears on the game screen and dances along to background music for a specified period of time. The player memorizes the motion pattern of the enemy character and operates a player character by inputting keys at the right time. When the motion pattern and motion timing of the player character matches the motion pattern and motion timing of the enemy character, marks (the variable) obtained by the player are added. On the other hand, when the motion patterns and motion timings of the player character and the enemy character do not correspond, marks are subtracted.

In this specification, the term "dance battle" is used to refer to a game in which the player character traces the enemy character's dance motions, and the accuracy of the player's input operation is judged. Moreover, in the following explanations, the term "score" refers to the marks obtained by the player and shown in the "highly fragmented display," and "points" means the marks obtained by the player in the "roughly fragmented display."

Referring to FIG. 2, the key input detecting means 21 checks every 1/60 of a second whether any key input has been provided by the controller 10. When the key input detecting means 21 detects the key operation input, it obtains key operation signals. Then, the key input detecting means 21, determines the type of key input by the player and the timing of the key input, and outputs detection signals to the correct or incorrect answer determining means 22. The correct or incorrect answer determining means 22, compares the detection signals with the correct answer input pattern 23, and thereby executes the correct or incorrect answer determination on the player's input operation. The point/score calculating means 24, calculates the marks obtained by the player on the basis of the result of the correct or incorrect answer determination. The point/score display switching means 25, switches the displays between the "score" and the "points" for each game scene. It generates video signals for displaying the marks as the "score" in the game scene which requires the "highly fragmented display," while it generates video signals for displaying the marks as the "points" in the game scene which requires the "roughly fragmented display."

Figure 3:
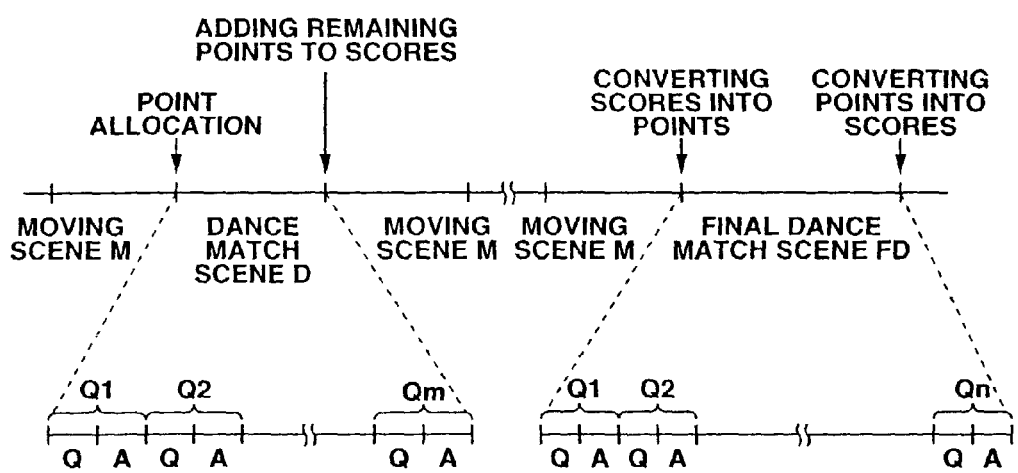
FIG. 3 is a diagram that explains the entire game proceedings.

The details of the game are now explained. FIG. 3 shows the whole game proceeding. In this game, a plurality of moving scenes M and a plurality of dance match scenes D are placed alternately. The moving scene M is a scene in which the player character moves in the game space. When the player character encounters the enemy character, the game scene proceeds to the dance match scene D. In the dance match scene D, dance matches $Q_1, Q_2, \ldots Q_m$ are performed m times. Each of the dance matches $Q_1, Q_2, \ldots Q_m$ consists of a question turn Q, in which the enemy character sets a dance quiz question and an answer turn A, in which the player character answers the dance quiz question. When the dance match scenes D are repeated a plurality of times, the player character reaches a final dance match scene FD which is the final stage. In the final dance match scene FD, dance matches $Q_1, Q_2, \ldots Q_n$ are performed n times.

Figure 5:
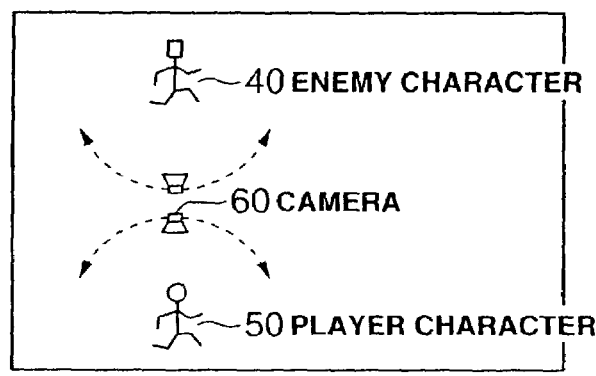
FIG. 5 is an explanatory drawing illustrating the position relationship between the enemy character and the player character at the time of a dance match.

FIG. 5 is an explanatory drawing of the position relationship between the enemy character 40 and the player character 50 at the time of the dance match. In the question turn Q, the enemy character 40 dances and, therefore, a camera (virtual visual point) 60 conducts camerawork in order to display the enemy character 40 on the display 31. On the other hand, in the answer turn A, the player character 50 dances and, therefore, the camera 60 conducts camerawork in order to display the player character 50 on the display 31.

Figure 4:
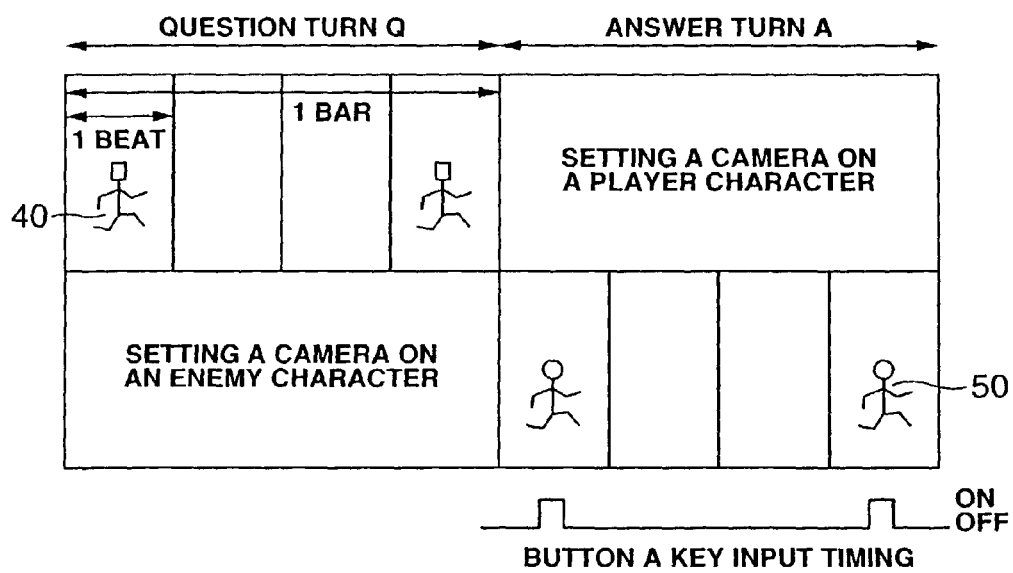
FIG. 4 is a diagram showing the motion timing of the character in a dance battle.

FIG. 4 is an explanatory diagram showing the motion timings of the characters in a dance battle. In the question turn Q, the enemy character 40 dances on the first and third beats in the first bar. The player memorizes the motion pattern and motion timing of the enemy character 40. Subsequently, when the game scene proceeds to the answer turn A, the player executes the key operation on the controller 10 and operates the player character 50 according to the details he/she has memorized. At this time, the key operation is executed by inputting the button A 14. As shown in FIG. 4, if the player can execute the key operation to make the player character 50 dance on the first and third beats in the fist bar, the player's marks will be added.

Moreover, in some game scenes, it is possible to employ a structure in which the player character 50, instead of the enemy character 40, dances. In this case, the player character 50 is operated by the key operation of the button B 15.

Figure 6:
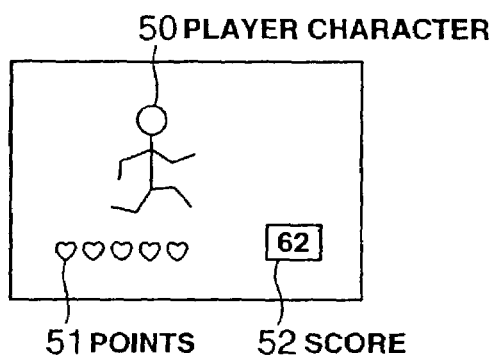
FIG. 6 is an explanatory drawing illustrating the state in which the player character is dancing.

FIG. 6 is an example game screen illustrating the state in which the player character 50 is dancing in the answer turn A. When the game scene proceeds from the moving scene M to the dance match scenes D, a specified number of heart-shaped points 51 are given to the player as shown in FIG. 6. Moreover, on the game screen, the marks obtained by the player are displayed as a score 52 in the "highly fragmented display." When the player accurately traces the motions of the enemy character 40 and the input operation is determined to be correct, a specified number of marks (for example, 4 marks) are added to the score 52. On the other hand, when the input operation is determined to be incorrect, one point is subtracted from the points 51, and a specified number of marks (for example, 4 marks) are subtracted from score 52.

Figure 8:
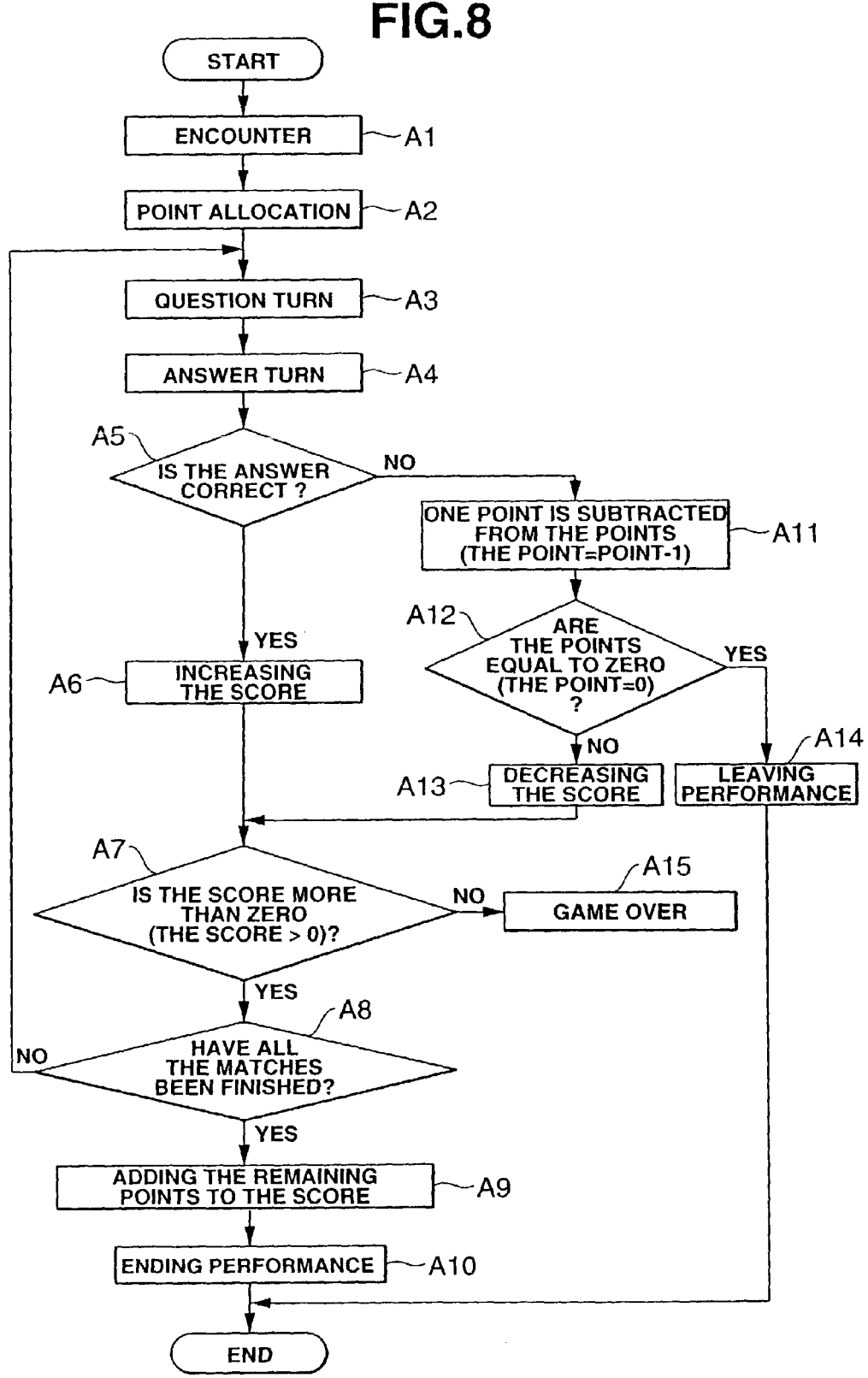
FIG. 8 is a flowchart describing the processing steps in the dance match scene.

The processing steps in the dance match scene D are now explained with reference to FIG. 8. In the moving scene M, when the enemy character 40 encounters the player character 50 (A1), the game scene proceeds to the dance match scene D, and a specified number of heart-shaped points 51 are provided as shown in FIG. 6 (A2). When the game scene proceeds to the dance match scene D, the dance match is performed, and the enemy character 40 dances in the enemy's question turn (A3). Subsequently, the game scene moves into the answer turn (A4), and the player operates the player character 50 by executing the key input. When the player's key input is determined to be correct (A5: YES), the score 52 is added (A6). On the other hand, when the player's key input is determined to be incorrect (A5: NO), only one point is subtracted from the points 51 (A11).

At this point, if the number of the points is determined to be zero (A12: YES), an image of the player character 50 leaving from the screen is displayed (A14), thereby ending the dance match scene D. If the number of points is a positive number (a natural number of 1 or more) (A12: NO), the score 52 is subtracted (A13). If the value of the score 52 is a positive number (A7: YES), and if all matches have not been finished (A8: NO), the processing steps from step A3 to step A7 are repeated. On the other hand, if the value of the score 52 is zero (A7: NO), the game is over (A15). If all matches have not been finished (A8: YES), the remaining points 51 are added to the score 52 (A9). When one point of the points 51 is worth "8 marks," and if two points 51 remain, 8 marks×2=16 marks are added to the score 52. The ending performance is then executed (A10), thereby ending the dance match.

As mentioned above, in the dance match scene D, the marks obtained by the player are displayed as the score 52 in the "highly fragmented display." Even if the player makes one mistake, only a highly fragmented unit change amount (in the above example, 4 marks) decreases. Accordingly, the damage that the player suffers is not so serious, and it is possible to provide a game environment in which the player can comfortably play the game. The player is able to grasp, in an analogue manner, the marks obtained by him or herself by visually identifying the score 52.

Figure 7:
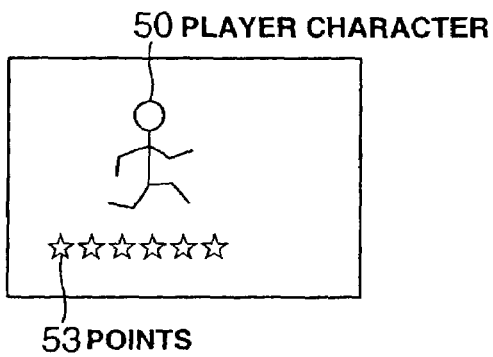
FIG. 7 is an explanatory drawing illustrating the state in which the player character is dancing.
Figure 9:
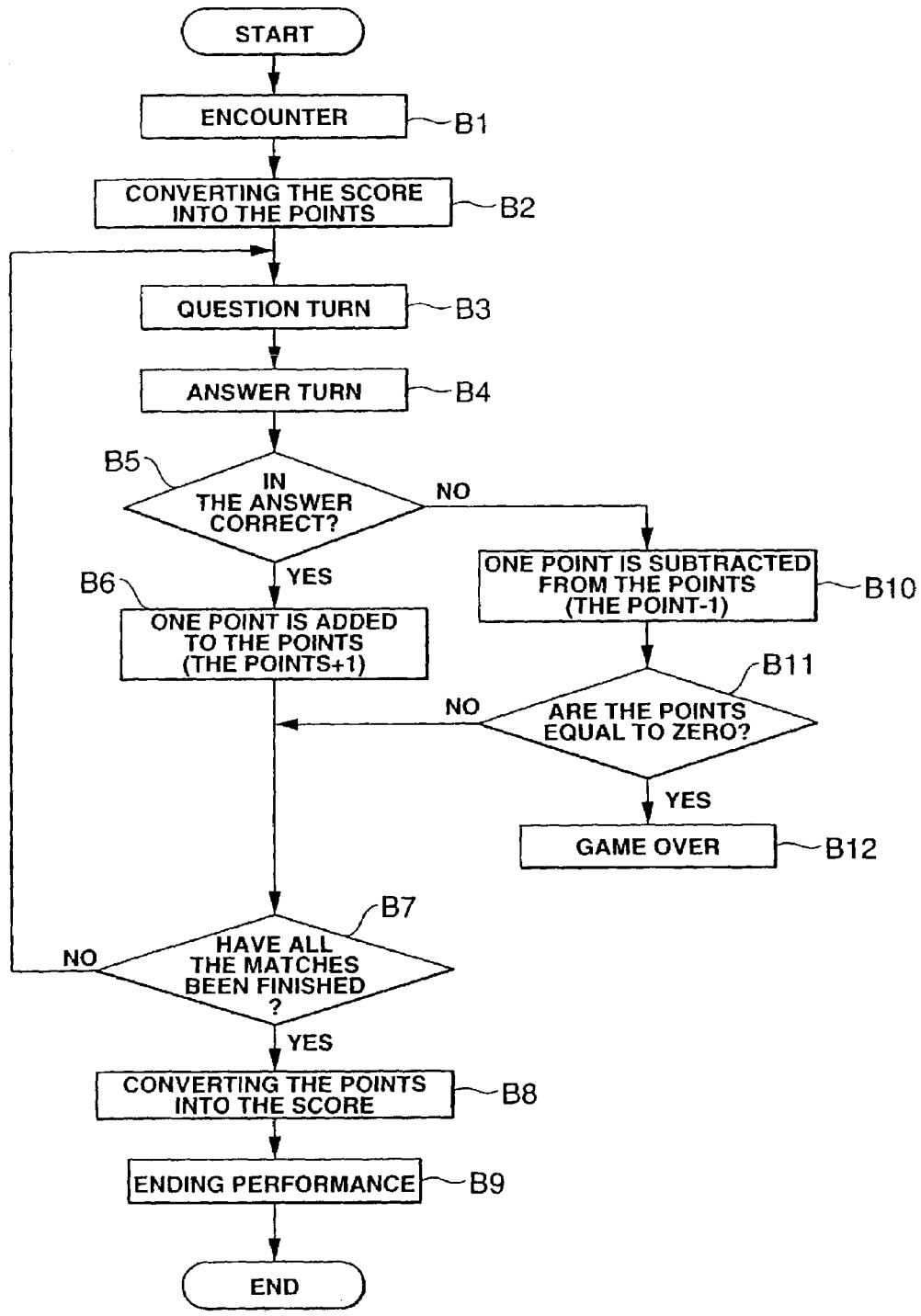
FIG. 9 is a flowchart describing the processing steps in the final dance match scene.

Next, the respective processing steps in the final dance match scene FD are now explained with reference to FIG. 9. In the moving scene M, when the enemy character 40 encounters the player character 50 (B1), the game scene proceeds to the final dance match scene FD. The value of the score 52 obtained in the previous dance match scene D is then converted into the star-shaped points 53, one point of which is worth "10 marks" (B2). For example, the score 52 which has a value of "62 marks" is converted into 6 points 53 (see FIG. 7). An explanation will be given later about how to treat the remaining 2 marks. As explained above, in the dance matches, the enemy character 40 dances in the question turn (B3), and then the player character dances in the player's answer turn (B4).

If the key input of the player is correct (B5: YES), the number of the points 53 increases by one (B6). On the other hand, if the key input of the player is incorrect (B5: NO), the number of the points 53 decreases by one (B10). If the number of the points 53 becomes zero (B11: YES), the game is over (B12). When the value of the points 53 is a positive number (B11: NO), and if all of the matches have not been finished (B7: NO), the processing steps from step B3 to step B7 are repeated. If all of the matches have finished (B7: YES), the points 53 are converted into the score 52 (B8). For example, if the player makes two mistakes and the number of the points 53 decreases to 4, the resultant number of marks will be: 10 marks×2+2 marks=42 marks (the 2 marks are the marks left over from the conversion processing of step B3). Finally, an ending performance is conducted (B9), thereby concluding the dance match.

As mentioned above, in the final dance match scene FD, the marks obtained by the player are displayed as the points 53 in the "roughly fragmented display." When the player makes one mistake, the points 53 decrease by one, and the roughly fragmented unit change amount (in the above example, 10 marks) is lost. Therefore, the damage that the player suffers is serious, and it is possible to provide a tense game environment. Moreover, the player can always keep track of the number of mistakes which he or she makes, by referring to the number of the points 53.

Figure 10:
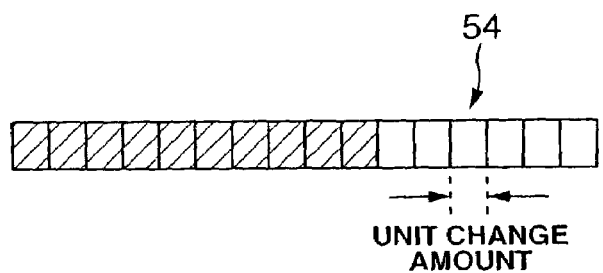
FIG. 10 is an explanatory drawing of a bar graph for a highly fragmented display.
Figure 11:
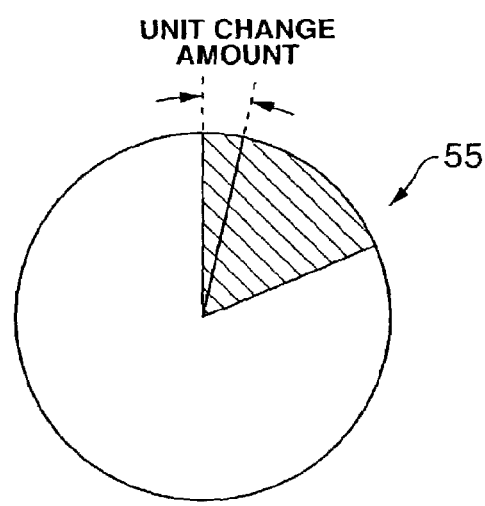
FIG. 11 is an explanatory drawing of a circle graph for a highly fragmented display.
Figure 12:
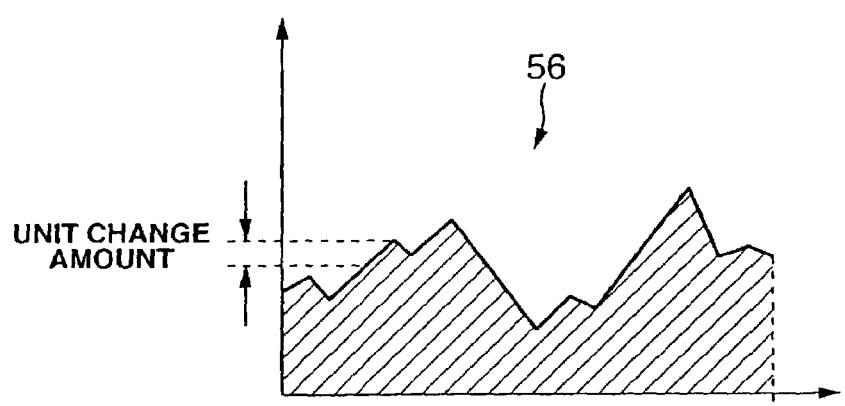
FIG. 12 is an explanatory drawing of a broken line graph for a highly fragmented display.

In the above explanation, when the marks obtained by the player are displayed in the "highly fragmented display," "numeric characters" such as the score 52 are used. However, anything that can display the marks in an analogue form, such as a bar graph 54 of FIG. 10, a circle graph 55 of FIG. 11, and a broken line graph 56 of FIG. 12, may be used, and the display state of the marks is not particularly limited. Moreover, the unit change amount of the bar graph 56, the circle graph 55, and the broken line graph 56 can be highly fragmented to realize the highly fragmented display, and can also be roughly fragmented to realize the roughly fragmented display.

Figure 13:
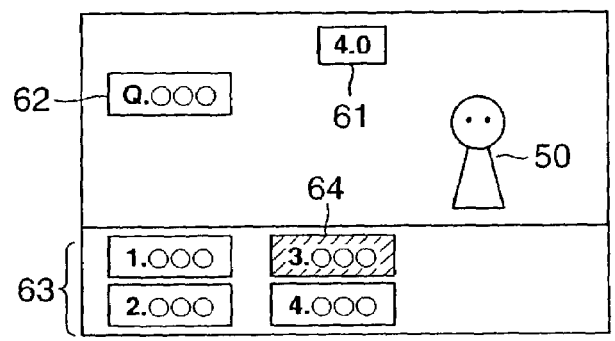
FIG. 13 is a diagram showing an example quiz screen.

As a variation of the above embodiment, it is possible to employ a structure in which the enemy character 40 sets a quiz question in the question turn Q of the dance matches, and the player character answers the quiz question in the answer turn A. FIG. 13 is a game screen showing the answering scene. In FIG. 13, a reference numeral 61 refers to a clock which displays the time left to answer a quiz question, a reference numeral 62 refers to a window in which a quiz question is written, a reference numeral 63 refers to a plurality of answers presented as answers, and a reference numeral 64 refers to a cursor for selecting the answer. The cursor 64 can be moved from side to side and up and down by using the direction key 11, and the color of the answer selected by the cursor 64 is reversed. In FIG. 13, the cursor 64 is pointing the third answer. The player answers the quiz question by placing the cursor 64 on the answer to select and by inputting a decision button. The decision buttons are the buttons A 14 and B 15.

The answer can be decided by inputting either of the decision buttons. However, in the present embodiment, when the player answers a quiz question, the motion of the character which answers the quiz question is changed according to the key type of the decision button selected by the player. For example, when the player answers with confidence, he/she inputs the button A 14, thereby displaying an image of the player character 50 cheerfully answering the quiz question with confidence. When the player answers without confidence, he/she inputs the button B 15, thereby displaying an image of the player character 50 answering the quiz question without confidence.

Figure 14:
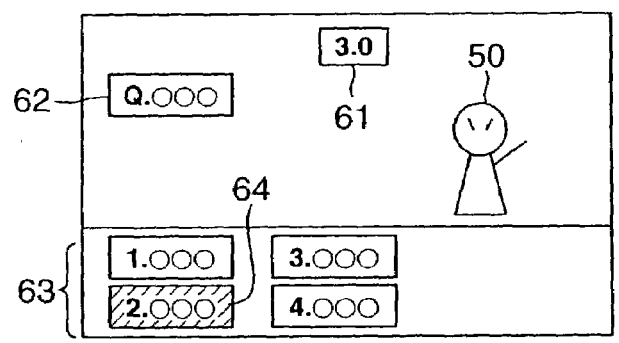
FIG. 14 is a diagram showing an example quiz screen.
Figure 15:
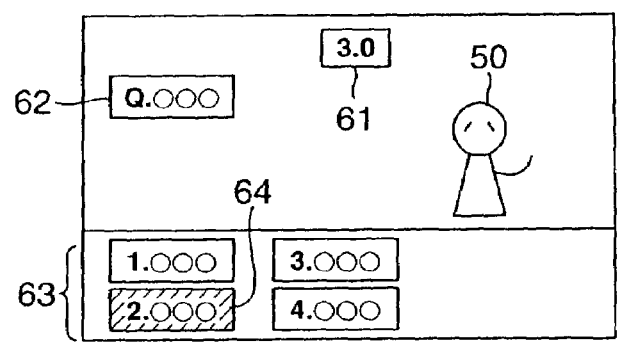
FIG. 15 is a diagram showing an example quiz screen.
Figure 17:
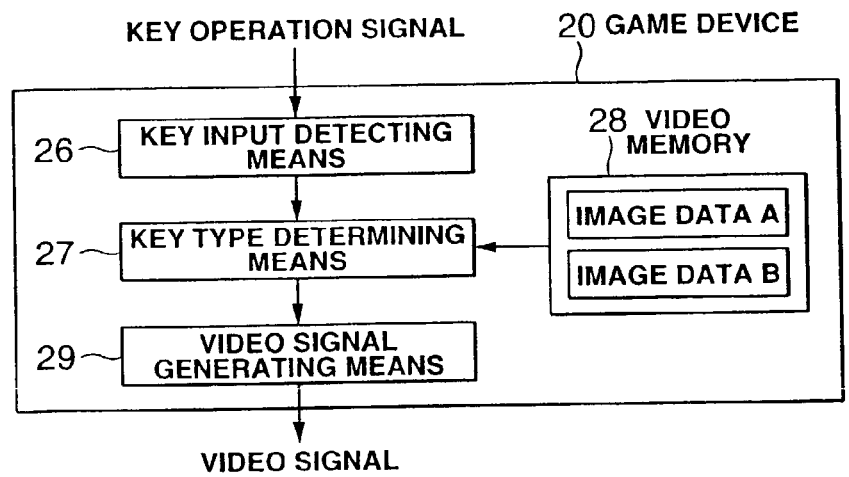
FIG. 17 is a functional block diagram of the game device.
Figure 18:
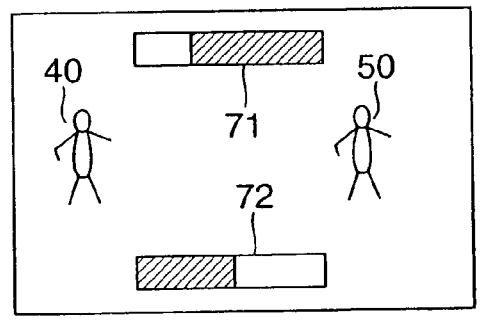
FIG. 18 is a game screen of a conventional fight game.
Figure 19:
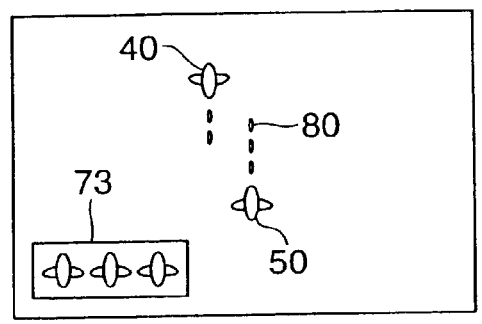
FIG. 19 is a game screen of a conventional battle game.

FIG. 17 is a functional block diagram of the game device 20. As shown in FIG. 17, the game device 20 comprises a key input detecting means 26, a key type determining means 27, a video memory 28, and a video signal generating means 29. Each of these means is realized in cooperation with hardware and software by executing a game program on an operating system. The key input detecting means 26, checks every 1/60 of a second whether any key on the controller 10 is input by the player. When the key input detecting means 26 detects input of key operation, it obtains key operation signals. The video memory 28, stores two kinds of image data A and B, which concern the player character answering a quiz question. As shown in FIG. 14, the image data A concerns the motion of the player character 50 answering a quiz question with confidence, while as shown in FIG. 15, the image data B concerns the motion of the player character 50 answering a quiz question without confidence.

The key type determining means 27, determines the key type of the input decision button. In the event of operation signals of the button A 14, the key type determining means 27 reads the image data A from the video memory 28. In the event of operation signals of the button B 15, the key type determining means 27 reads the image data B and outputs it to the video signal generating means 29. The video signal generating means 29 generates NTSC system video signals from the image data output from the video memory 28, and then outputs the video signals to a TV monitor.

Figure 16:
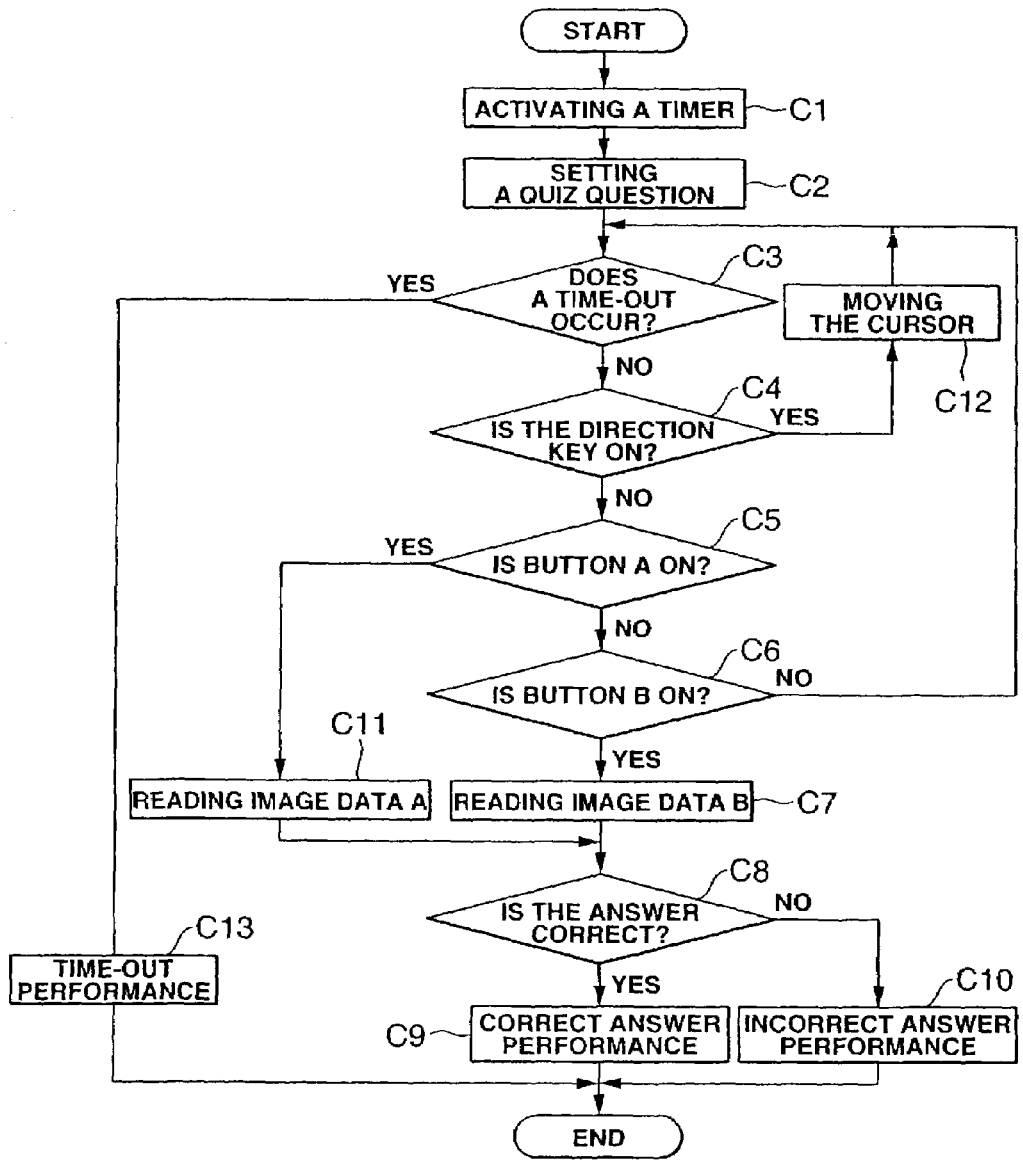
FIG. 16 is a flow chart describing the flow chart of the quiz game.

FIG. 16 is a flowchart describing the processing steps of the game device 20 at the time of answering quiz questions. When the game scene proceeds to the scene of answering quiz questions, a timer which prescribes the answering time is first activated (C1). Next, the enemy character sets a quiz question (C2). If the direction key 11 is input (C4: YES) within the time prescribed by the timer (C3: NO), the cursor is moved in a designated direction (C12). If the button A 14 is input (C5: YES), the image data A is read (C11). If the button B 15 is inputted (C6: YES), the image data B is read (C7) and is then converted into NTSC system video signals, which are output to the TV monitor. If the answer selected by the player is correct (C8: YES), correct answer performance is executed (C9). If the answer selected by the player is incorrect (C8: NO), incorrect answer performance is executed (C10). On the other hand, if no answer is given within the prescribed time, and a time-out occurs (C3: YES), time-out display appears (C13), thereby ending the quiz.

As mentioned above, according to this embodiment, even when the same quiz question answering action is intended, it is possible to change the motion of the player character according to the key input selected by the player, thereby making it possible to create a more amusing and enjoyable game environment.

According to the present invention, in order to continue playing the game, by changing the display state of the player's variable which changes in a large or small amount according to the extent of the advantageous/disadvantageous state for the game player, it is possible to realize game scenes that can be comfortably enjoyed and game scenes with a tense atmosphere and to create a more amusing game environment. Moreover, since the motion state of the character can be changed through the player's input operation, it is possible to demonstrate the performance effect selected by the player.

What is claimed is:

1. An image display method for a game apparatus that executes game processing by obtaining an operating signal input by a player, generates a game image, and displays the game image, comprising:
   displaying, in a first game scene, a score in a first display form that is obtained based on the operation signal input by the player as the game processing is executed, wherein it is determined whether the score is more than zero or not, and if the score is determined to be more than zero the score is a variable that increases or decreases according to an evaluated extent of an advantage or a disadvantage of a state of the player relative to progress of the game, which is necessary for a character played by the player to continue playing the game and that is displayed in the first game scene as a number or graph, and if the score is determined to be zero, the game is over;
   switching from the first game scene to a second game scene, wherein the first game scene and the second game scene are scenes in which the player is playing the game, and the switching includes changing the display form of the variable according to the game scene, the display form being dependent on the game scene, and the switching further comprising converting the score from a first display form to a second display form; and
   displaying the score in the second display form in the second game scene, wherein the score is converted into a number for a predetermined plurality of display objects representing a number of times a match can be performed that decreases in accordance with a number of times the player has made mistakes, wherein it is determined whether a converted number of display objects is more than zero or not, and if the converted number of display objects is more than zero the converted number of display objects are displayed in the second game scene, and if the converted number of display objects is zero, the game is over.

2. The image display method according to claim 1, wherein the graph is any one of a bar graph, a pie chart, or a line graph.

3. The image display method according to claim 1, wherein the variable is an energy value that the character operated by the player virtually possesses and that is necessary for the character to continue playing the game.

4. A computer program product having a program for making a game apparatus execute game processing by obtaining an operation signal input by a player and generating a game image, the computer program being recorded on a computer-readable recording medium, wherein the game apparatus executes:

displaying, in a first game scene, a score in a first display form obtained based on the operation signal input by the player as the game processing is executed, wherein it is determined whether the score is more than zero or not, and if the score is determined to be more than zero the score is a variable that increases or decreases according to an evaluated extent of an advantage or a disadvantage of a state of the player relative to progress of the game, which is necessary for a character played by the player to continue playing the game and that is displayed in the first game scene as a number or graph, and if the score is determined to be zero, the game is over;

switching from the first game scene to a second game scene, wherein the first game scene and the second game scene are scenes in which the player is playing the game, and the switching includes changing the display form of the variable according to the game scene, the display form being dependent on the game scene, and the switching further comprising converting the score from a first display form to a second display form; and displaying the score in the second display form in the second game scene, wherein the score is converted into a number for a predetermined plurality of display objects representing a number of times a match can be performed that decreases in accordance with a number of times the player has made mistakes, wherein it is determined whether a converted number of display objects is more than zero or not, and if the converted number of display objects is more than zero the converted number of display objects are displayed in the second game scene.

5. The computer program product according to claim 4, wherein the graph is any one of a bar graph, a pie chart, or a broken line graph.

6. A computer program product according to claim 4, wherein the variable is an energy value that the character operated by the player virtually possesses and that is necessary for the character to continue playing the game.

* * * * *